United States Patent

Hallman et al.

[15] 3,637,383

[45] Jan. 25, 1972

[54] RADIATION-SENSITIVE ELEMENTS AND ETCH PROCESSES USING THE SAME

[72] Inventors: Robert W. Hallman, Utica; Gary W. Kurtz, Southfield, both of Mich.

[73] Assignee: Teeg Research, Inc., Detroit, Mich.

[22] Filed: July 14, 1969

[21] Appl. No.: 841,416

Related U.S. Application Data

[63] Continuation-in-part of Ser. No. 627,754, Apr. 3, 1967, abandoned, Continuation-in-part of Ser. No. 636,863, May 8, 1967, abandoned.

[52] U.S. Cl. ....................................96/36, 96/36.4, 96/36.2, 96/36.3, 96/86, 96/88, 96/67, 156/3, 156/4, 156/17, 156/18, 250/65 R, 250/65.1

[51] Int. Cl. ........................................G03c 1/76, G03c 5/00

[58] Field of Search.......................96/1.5, 27, 36, 36.2, 36.3, 96/86, 88; 252/501; 156/3, 4, 17, 18; 117/93.3, 217; 29/195; 250/65, 65.1; 204/157.1

[56] References Cited

UNITED STATES PATENTS

| | | | |
|---|---|---|---|
| 3,122,463 | 2/1964 | Ligenza et al | 156/4 |
| 3,271,180 | 9/1966 | White | 96/36 X |
| 3,345,384 | 10/1967 | Gaynor | 96/36 |
| 3,377,169 | 4/1968 | Blake | 96/88 |
| 3,386,823 | 6/1968 | Keller et al. | 96/27 |

FOREIGN PATENTS OR APPLICATIONS

| | | |
|---|---|---|
| 344,354 | 3/1931 | Great Britain |
| 968,141 | 8/1964 | Great Britain |
| 1,151,310 | 9/1969 | Great Britain |

OTHER PUBLICATIONS

Kostyship et al., " Photographic-Sensitivity Effect in Thin Semiconducting Films on Metal Substrates," Soviet Physics–State, Vol. 8, No. 2, Feb. 1966, pp. 451–452

*Primary Examiner*—George F. Lesmes
*Assistant Examiner*—R. E. Martin
*Attorney*—Hauke, Gifford and Patalidis

[57] ABSTRACT

Radiation-sensitive elements comprising a pair of layers of dissimilar inorganic materials capable of interreacting when subjected to impinging electromagnetic actinic radiation with the formation of an interreaction product or products corresponding to the areas exposed to such radiation, and further comprising at least one underlying layer of a third material which is sought to be discretely and selectively etched according to a pattern or image projected upon the sensitive element. The portions of the radiation-sensitive element which have not been exposed to actinic radiation act as a resist material during etching of underlying layers, such that a relief representation of the original image projected upon the sensitive element is obtained by a simple process consisting principally of exposure to actinic radiation followed by a one-step or two-step etch operation.

24 Claims, 28 Drawing Figures

INVENTORS
ROBERT W. HALLMAN
GARY W. KURTZ

By Hauke, Gifford, & Patalidis
ATTORNEYS

INVENTORS
ROBERT W. HALLMAN
GARY W. KURTZ

By Hauke, Gifford, & Patalidis
ATTORNEYS

INVENTORS
ROBERT W. HALLMAN
GARY W. KURTZ

By Hauke, Gifford, & Patalidis

ATTORNEYS

INVENTORS
ROBERT W. HALLMAN
GARY W. KURTZ

By Hauke, Gifford, & Patalidis
ATTORNEYS

RADIATION-SENSITIVE ELEMENTS AND ETCH PROCESSES USING THE SAME

CROSS-REFERENCE TO RELATED APPLICATIONS

The present application is a continuation-in-part of applications Ser. Nos. 627,754, filed Apr. 3, 1967 and 636,863, filed May 8, 1967, both abandoned and is related to applications Ser. Nos. 839,038 filed July 3, 1969 and 841,718, filed July 15, 1969.

BACKGROUND OF THE INVENTION

In the copending applications there are disclosed electromagnetic radiation-sensitive elements which typically consist of a metallic layer, as defined therein and herein, deposited or not on a support backing or substrate, the metallic layer being coated with an adhering overlayer of an inorganic material capable of interreacting with the metallic layer when exposed to incident electromagnetic actinic radiation such as light radiation and the like. The radiation induced interreaction between the metallic layer and the overlayer extends in depth from the interface between the metallic layer and the overlayer proportionally to the exposure of the sensitive element to radiation. There is formed at the interface between the metallic layer and the overlayer, as a result of such radiation-induced interreaction, a product or products having chemical compositions and physical characteristics different from those of the constituents of both the metallic layer and the overlayer. For sufficient exposure either in time or radiation intensity, or both, of the irradiated boundary or interface areas, the formation of such interreaction product or products is sufficient to consume in depth the totality of the metallic layer, such as to provide a surface to surface radiation induced selective and discrete etching of portions of such metallic layer, thus forming a relief metallic image.

The interreaction ceases as soon as the radiation-sensitive element is no longer exposed to incident actinic radiation and the relief metallic image remains stable for a considerable period of time without any further processing. The interreaction product may be removed, if so desired, by simple mechanical means, by heat sublimation or by dissolution in an appropriate solvent.

The radiation-sensitive elements may be disposed upon a support member or substrate which remains unaffected during the exposure step to actinic radiation or, in some applications, the radiation-sensitive elements may be used without any support member or substrate. Utilizing the radiation-sensitive elements disclosed in the said copending applications, and utilizing the methods described therein, many useful articles may be manufactured, such as lithographic plates, metal engravings, photographs, printed circuits, etc., by means that compare favorably with conventional photographic methods, without the use of complicated and costly processing methods and chemicals. The finished articles consist of a metallic layer having selectively etched portions of depth substantially proportional to the amount of illumination or irradiation of the radiation-sensitive element, the unexposed portions remaining intact. When the exposure is sufficient to react the whole thickness of the metallic layer by interreaction with the inorganic material of the overlayer at the portions of the element upon which the actinic radiation is impinged, there is caused a complete etching effect upon the metallic layer. The clean edge silhouettelike metallic image thus obtained has, as will be apparent to those skilled in the art, many applications, a few of which are enumerated in the aforesaid copending applications, and hereinafter.

SUMMARY OF THE INVENTION

The present invention consists of an improvement for obtaining more particularly a metallic image or pattern or a nonmetallic image or pattern on a support member by a simple modification of the structure of electromagnetic radiation-sensitive elements disclosed in the said copending applications by providing one or more layers of dissimilar materials below the metallic layer such that, when the interreaction product is removed, the first underlayer is bared at the areas corresponding to those exposed to the action of the actinic radiation. If so required, the exposed portions of the underlayer may be etched away or dissolved in an appropriate manner.

The present invention, furthermore, by providing a radiation-sensitive element disposed upon the surface of a plate, foil, thin-film, or the like, of a material which is sought to be etched according to a predetermined pattern, offers the possibility of obtaining a relief image of substantial depth by utilizing the remaining, i.e., the unexposed portions, of the radiation-sensitive element as a photoresist for the underlying layer. Diverse finished articles, such as printing plates, printed circuits, gratings, flexographic plates, aperture masks, grids, gratings, diffraction and interference slits, etc., may be obtained simply and economically, by a simple process which, in some applications, may consist of a single etching step following projection upon the surface of the radiation-sensitive element of an image to be reproduced. Depending upon the structure of the radiation-sensitive element and/or depending upon the nature of the finished article to be obtained by the process of the invention, finished articles may be obtained, alternately, as a result of sequentially treating the exposed photosensitive element by way of one, two, or more solvents or etchants having selective effects upon the diverse layers of materials forming the sensitive element.

The several objects and advantages of the present invention will be come readily apparent to those skilled in the art when the following description of a few examples of preferred embodiments of electromagnetic radiation-sensitive elements and typical methods contemplated for practicing the invention is read in conjunction with the accompanying drawings wherein:

DESCRIPTION OF THE PREFERRED EMBODIMENTS

Figure 1:
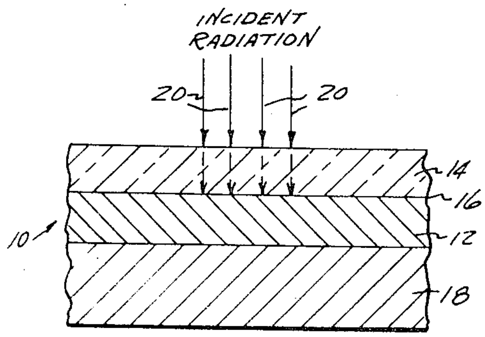
FIG. 1 is a schematic illustration in section of an example of structural embodiment of a radiation-sensitive element according to the present invention in the course of selective and discrete exposure to incident electromagnetic actinic radiation.

Referring now to the drawings, and more particularly to FIG. 1 thereof, an electromagnetic radiation-sensitive element, as generally indicated at 10 in a schematic exaggerated manner in section, is made by coating a metallic foil or layer 12, as defined hereinafter with an overlayer 14 of an inorganic material capable, when exposed to electromagnetic actinic radiation, of interreacting with the metallic layer 12 at the boundary 16 therebetween. Below the metallic layer 12 is disposed an adhering second layer or substrate 18 which may consist of a nonmetallic material such as a glass, a plastic, or the like, or it may consist alternately of a metal preferably such as aluminum or magnesium.

A list of elements metals particularly suitable for the layer 12 includes silicon and metals such as silver, copper, lead, cadmium, zinc, iron, tin, arsenic, bismuth, cobalt, germanium, indium, manganese, mercury, nickel, selenium, tellurium, thallium, and vanadium. Such layer 12 is in the form of a thin foil or coating on the substrate 18, of a thickness that may vary, according to the purpose to be accomplished and according to the proposed use of the sensitive element, from a few atoms layers to a fraction of a mil or even to several mils. When using a very thin layer 12 which is substantially "transparent," i.e., which has substantially good transmissivity to the actinic radiation, the sensitive element may be exposed by causing the incident radiation to impinge upon the surface of the substrate 18 of the layer 12 (FIG. 1), as well as causing the radiation to impinge upon the surface of the overlayer 14, as long as the substrate 18 is also "transparent" to the radiation.

By "metallic layer" is meant herein a layer containing silicon or any one of the common metals hereinbefore mentioned, either alone, or alloyed to another common metal, or in the form of a metallic mixture. Consequently, the term "-metallic layer" as used herein means a material containing silicon or at least one metal in the form hereinbefore indicated.

The overlayer 14 is also substantially thin, of the order of a few atom layers to several microns, or even a few mils, and it may consist of any one of a variety of ternary and binary inorganic materials and compounds and any one of a few elements. An example of ternary material, which has been found to be particularly suitable, is a glassy material consisting of arsenic, sulfur and iodine for example in the following proportions: arsenic—40 percent by weight, sulfur—50 percent by weight and iodine—10 percent by weight, although the proportion of iodine may be within the range of 1 to 30 percent by weight. Appropriate examples of such ternary materials are given in U.S. Pat. No. 3,024,119 issued March 6, 1962. Chlorine, bromine, selenium, thallium or tellurium may be substituted for iodine.

A multitude of binary compounds and mixture have been found to be useful for the inorganic material of the overlayer 14. Examples of such binary compounds or mixtures comprise halides of metals, such as copper, antimony, arsenic, sulfur, thallium, lead, cadmium and silver, and sulfides, arsenides, selenides and tellurides of such metals. The most suitable materials, presenting substantial actinic sensitivity when deposited on a metallic layer of copper, silver, lead, zinc, etc., for example are arsenic-sulfur mixtures and compounds, antimony-sulfur compounds and mixtures, silver-sulfur compounds and mixtures, bismuth-sulfur compounds and mixtures, chromium-sulfur compounds and mixtures, lead iodide, copper chloride, stannous chloride, mercury chloride, arsenic selenides, selenium-sulfur compounds and mixtures, chromium selenides and indium-sulfur compounds and mixtures. It seems that the property of reacting with a metallic layer under the influence of electromagnetic actinic radiation is shared by a variety of mixtures and compounds, having such property to varying but generally useful degrees. Such binary compounds and mixtures may be generally cataloged as consisting of a metal halide or a mixture of a metal with a halogen, metal selenide or a mixture of a metal with selenium, metal sulfide or a mixture of a metal with sulfur, and metal telluride or a mixture of metal with tellurium. Stoichiometric proportions are not critical, but it is preferable that the resulting material be substantially transparent to electromagnetic actinic radiations of an appropriate wavelength, specially when the overlayer is substantially thick.

Single elements, such as halogens, are also capable of reacting with a metallic layer when exposed to electromagnetic actinic radiation.

A general grouping of inorganic materials suitable for forming an actinically reactive overlayer when disposed on a metallic layer therefore consists of halogens, sulfur, selenium, M—X compounds and mixtures and M—X—Y compounds and mixtures, wherein M is a metal and and Y are selected from the group consisting of a halogen, sulfur, selenium and tellurium; the metal M in the compounds and mixtures is selected from the group consisting of arsenic, antimony, bismuth, selenium, tellurium, copper, zinc, cadmium, mercury, lead, chromium, gallium, indium, thallium, germanium, tin, iron, cobalt, nickel and silver.

A particularly suitable binary material presenting substantial sensitivity when deposited on a layer of silver, copper, cadmium, lead, zinc or other metal is an arsenic-sulfur compound or mixture in a glassy or vitreous form and which presents remarkably good radiation transmissivity from the infrared to the ultraviolet region of the electromagnetic spectrum. For example, by using a vitreous overlayer 14 of arsenic-sulfur deposited upon a metallic layer 12 of silver, the quality of the relief image obtained in the finished article is remarkable in its resolution which may be as low as 500–1000 A., which compares very favorably with the resolving power of ordinary photographic emulsions. This is a very important quality when the finished article must present a high resolution as will be the case, for example, if the finished article is a diffraction grid or grating, or the like. The proportions of arsenic and sulfur may be any adequate proportion which permit to obtain a vitreous material, such proportions preferably ranging from about 40 percent arsenic—60 percent sulfur by weight to 70 percent arsenic—30 percent sulfur by weight.

In copending application Ser. No. 839,038, filed July 3, 1969, there is disclosed several examples of preparation of electromagnetic radiation sensitive elements according to the invention. Elements such as element 10 of FIG. 1 herein may be prepared typically as follows:

A plate of aluminum constituting the substrate 18 of any appropriate dimension, 1 or 2-mils-thick, is placed in a bell jar evacuated at about 0.5 micron pressure. Silver metal is evaporated from tungsten electrical resistance heaters brought to about 1,100° C. by the passage of electrical current therethrough, a silver coating or ribbon being disposed on the tungsten filament. By evaporating the silver for about 3 seconds, a silver layer 12 on the aluminum substrate 18 is obtained, having a thickness of about 4,000 A. Longer evaporation times provide proportionally thicker silver layers. For example, 15- to 20-seconds evaporation time provides silver layers on the substrate having a thickness of approximately 1 micron. The thickness of the thin-film or layer 12 of silver can be continuously monitored by means of a thickness monitor.

As previously mentioned, other metals may be used to form a substrate 18, or nonmetallic materials such as a glass, plastic, paper or the like, may be used instead of a metallic substrate.

Vapor-deposition techniques may also be used for depositing on the top of the silver layer 12 an overlayer 14 of any of the inorganic materials hereinbefore listed. Typically, the substrate 18 having a superficial layer of silver 12 thereon is placed in a bell jar evacuated at about 0.1 micron pressure. A quartz crucible is placed in the bell jar in an electrical resistance heater and is loaded with pieces of the inorganic material, such as for example arsenic trisulfide, $As_2S_3$. The surface of the silver layer 12 is typically located at a distance of about 6 inches away from the quartz crucible. The arsenic trisulfide is heated in the crucible to about 350° to 400° C., and a thin film arsenic trisulfide, forming the overlayer 14, is deposited on the surface of the silver layer 12 by evaporating the arsenic trisulfide from the quartz crucible for about 30 to 40 seconds, thus providing a thickness of the overlayer 14 of approximately 4,000 A. Longer deposition times provide greater thickness of the overlayer, while shorter deposition time provide proportionally thinner overlayers.

Any one of the herein mentioned inorganic materials may be substituted for the arsenic trisulfide, and other techniques may be used for depositing the overlayer 14 upon the metallic layer 12. For example, the inorganic material may be dissolved in an appropriate solvent and painted or sprayed over the surface of the metallic layer, or cathode sputtering and other techniques may be used with equal success.

The radiation-sensitive element 10 of FIG. 1 is exposed to electromagnetic actinic radiation, such as intense light illumination through an appropriate mask, or is exposed to illumination resulting from an image being projected thereon, preferably on the side formed by overlayer 14. As a result of such image being projected thereon, or as a result of discrete exposure to incident actinic radiation, as shown at 20 in FIG. 1, of some portions of the surface of the sensitive element, the electromagnetic actinic radiation causes an interreaction between the metal, such as silver, of metallic layer 12 and the inorganic material, such as arsenic trisulfide, or the overlayer 14 so as to form an interreaction product or products, as shown at 22 in FIG. 2. As a result of adequate exposure in intensity and duration to the electromagnetic radiation, the formation of such interreaction product or products 22 causes a selective etching of the metallic layer 12, corresponding to the portions of the radiation-sensitive element exposed to intense illumination by the electromagnetic actinic radiation, which substantially exhausts discretely at the area or areas of illumination all the silicon or metal of the metallic layer 12 and part or all of the inorganic material of the overlayer 14. For example, exposures of 3 and 5 minutes to a 600-watt quartz iodine lamp are sufficient to completely etch in depth a silver layer 2,000- to 4,000-A.-thick, provided with an 8,000 A. overlayer of arsenic trisulfide. Because of the material of the substrate 18 is of a kind that does not react, under illumination, with the material of overlayer 14, the radiation provoked interreaction terminates at the boundary 24 between the metallic layer 12 and the substrate 18.

Figure 3:
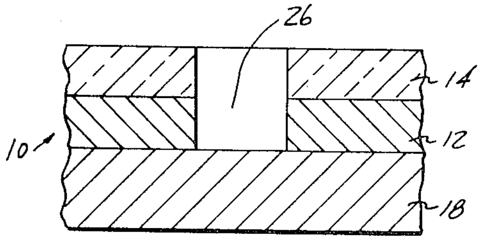
FIG. 3 is a schematic illustration of the appearance of the photosensitive element after removal of the radiation-provoked interreaction product or products.

The portions of the radiation-sensitive element which have not been impinged upon by electromagnetic actinic radiation are left undisturbed such that if the interreaction product or products 22 is removed by mechanical or other means, as explained in detail in the aforesaid copending applications, the resulting article is as shown in FIG. 3 with voids 26 in the overlayer 14 and in the metallic first layer 12 corresponding to the portions of the radiation-sensitive element previously exposed to illumination.

For example, the interreaction product 22 may be removed by wiping the surface of the overlayer 14 with a cloth, applying to the surface of the overlayer an ordinary pressure adhesive tape and pulling the tape, the interreaction product remaining attached to the tape, or by playing on the surface of the overlayer an appropriate solvent such as an acid, for example nitric or sulfuric acid, with the overlayer made of arsenic trisulfide.

Figure 2:
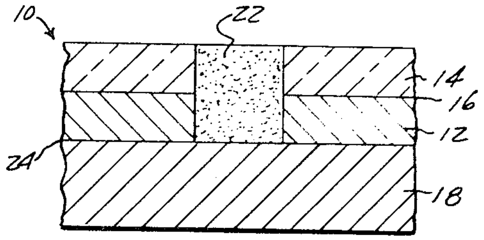
FIG. 2 is a schematic illustration of the element of FIG. 1 after exposure to incident electromagnetic actinic radiation having impinged upon a discrete portion of the surface of the element.

For some applications the article represented in FIG. 3 is a finished product, as for example where it is desired to have a metallic pattern in the form of an etched metallic layer 12 disposed upon the metallic or nonmetallic substrate 18, such layer being provided with a coating of the material of the overlayer 14 having also a pattern corresponding to the pattern of the metallic layer 12. In some applications also, even the article schematically illustrated in FIG. 2 is a useful article, where it is not necessary to eliminate the interreaction product or products 22.

However, in some applications where it is desired to reproduce the pattern of the metallic layer 12 upon the substrate 18, the article as shown in FIG. 3 is subjected to the action of an appropriate etchant being played upon the face of the element provided with the conveyor 14. With the metallic layer 12 made of silver, copper, nickel, or the like, and with the substrate 18 made of aluminum or magnesium, an acid such as hydrofluoric acid, or a basic solution such as a solution of sodium hydroxide, is preferably used for etching entirely through the substrate 18, as shown at 28 in FIG. 4. It is evident that if the etchant is not allowed to etch completely the exposed portions of the substrate 18, a relief image is obtained upon the substrate 18 instead of etching all the way through the substrate layer. When the substrate 18 consists of a material such as a plastic or resin, an appropriate solvent for the plastic or resin composition is used as the etchant. For example, if the substrate is made of cellulose acetate, acetone may be used at the etchant.

Figure 4:
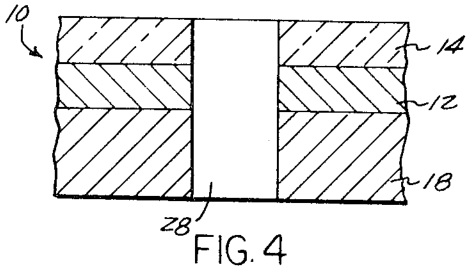
FIG. 4 is an illustration of a finished article obtained according to an aspect of the invention.
Figure 5:
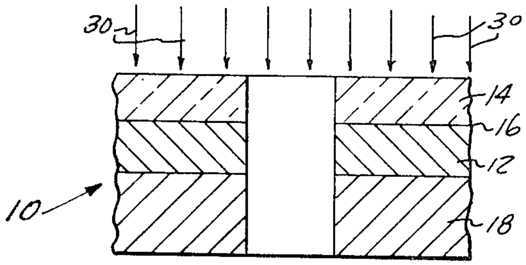
FIG. 5 is a schematic illustration of an alternate additional step in the preparation of a finished article using the radiation-sensitive element of FIG. 1.
Figure 6:
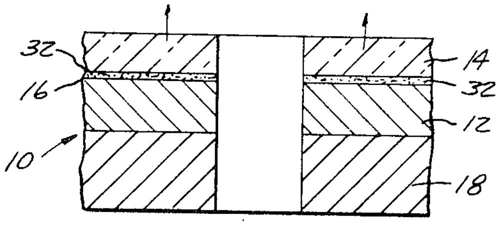
FIG. 6 is a schematic illustration of an intermediary step in the method.
Figure 7:
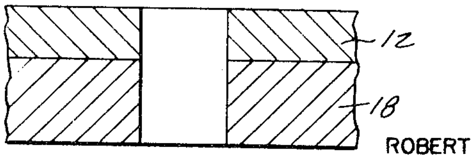
FIG. 7 is a schematic illustration of an alternate configuration of a finished article.

Articles such as schematically represented in FIG. 4 have many practical applications such as, for example, for forming interconnections between integrated circuits or for forming high-frequency printed circuits, and the like, with or without an appropriate backing to which the article is bounded. If it is desired to eliminate from the surface of the metallic layer 12 the portions of the inorganic overlayer 14 adhering thereto, such overlayer may be mechanically or chemically removed, as explained in the aforesaid copending applications and hereinbefore or alternately, as shown in FIG. 5, the overlayer 14 may be removed by exposure for a short period of time to incident electromagnetic actinic radiation, as shown at 30, of the whole surface of the article. As shown in FIG. 6, at the boundary 16 between the metallic layer 12 and the overlayer 14 there is formed a substantially thin layer of interreaction product as shown at 32, such that the remaining overlayer 14 can be easily removed, for example by using a sheet of material coated with an adhesive as explained in the copending applications, such as to provide an article substantially as shown in FIG. 7. Such an article consists of a pattern of the metal forming the metallic layer 12 upon a pattern of the metal or other material forming layer 18.

It is obvious that the second exposure of the sensitive element to electromagnetic radiation, as illustrated at FIG. 5, may be accomplished at any time after the first pattern producing exposure has been effected. All that is required for the second exposure is that it be uniform and less pronounced that the first exposure, i.e., that the duration of exposure be less or that the illumination be less than during the first exposure, so as to leave most of the metal of the metallic layer 12 substantially intact, with only a small amount of interreaction product 32 being formed under the influence of the electromagnetic actinic radiation, at the boundary 16 between the metallic layer 12 and the overlayer 14, thus substantially reducing the strength of the bound existing between the metallic layer 12 and the overlayer 14.

Figure 8:
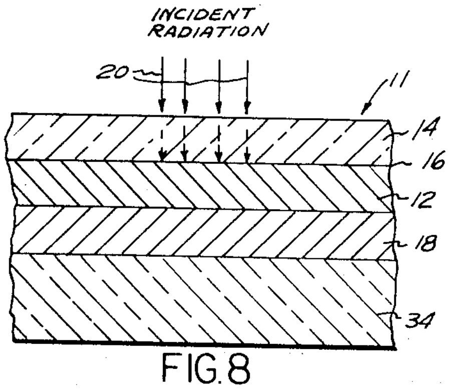
FIGS. 8–14 are illustrations similar to FIGS. 1–7, but illustrating an alternate configuration of electromagnetic radiation-sensitive element according to the present invention and alternate methods of obtaining finished articles by using such element.
Figure 9:
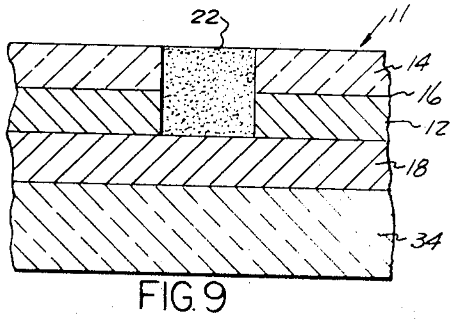
Figure 10:
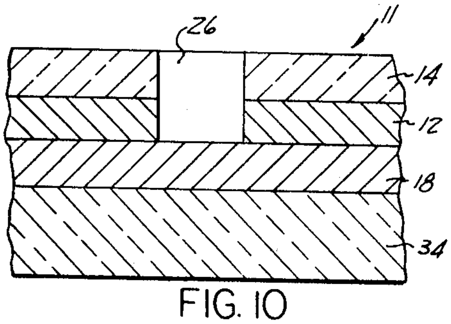
Figure 11:
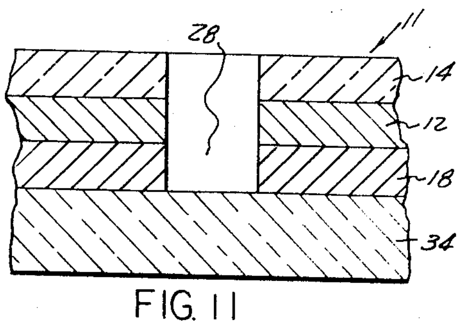
Figure 12:
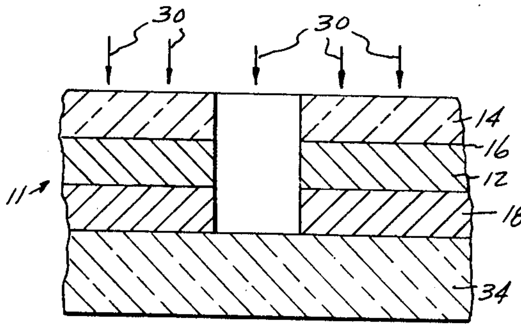
Figure 13:
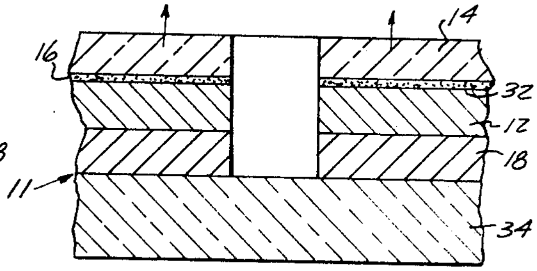
Figure 14:
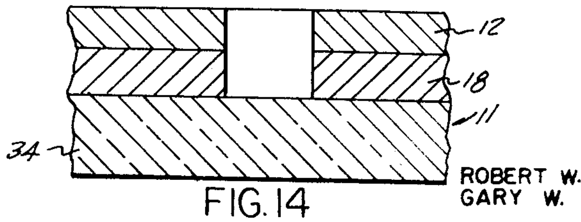

FIG. 8 illustrates schematically a radiation-sensitive element 11 substantially like the radiation-sensitive element 10 hereinbefore described, the only modification consisting of the addition of a support member or second substrate 34 upon which the first substrate 18 is deposited or to which it is bounded. The electromagnetic actinic radiation-sensitive element 11 is exposed in the same manner as precedently explained, FIGS. 8 to 14 corresponding to FIGS. 1 to 7 respectively, such that the finished article, see FIGS. 10, 11 and 14, is provided with a support member or second substrate 34 of a material such as, for example, glass, ceramic, metal, etc., appropriate to the particular application of each article, the only requirement being that where it is desired to etch the first substrate 18, the material of the second substrate or support member 34 must present considerable resistance to the action of the etchant or solvent.

It is readily apparent that the selection of an appropriate selective solvent for the different layers is based upon ordinary knowledge of chemistry. As general guidelines, the interreaction product is generally soluble in acid such as nitric acid, sulfuric acid, hydrochloric acid and hydrofluoric acid, while the inorganic materials forming the overlayer are generally resistant to the action of such acids. Basic solutions such as sodium and ammonium hydroxide, sodium carbonate and sulfate, sodium silicate and sulfide of a pH preferably above 8 or 9, are appropriate solvents for the inorganic material of the overlayer, and do not attack most common metals. However, aluminum is attacked by sodium hydroxide, while it is not appreciably attacked by ammonium hydroxide. Hydrofluoric acid attacks aluminum and magnesium but not appreciably attack silver, copper, iron, lead, etc.

Such examples of solvents and the typical example of a structure of a radiation electromagnetic element according to the invention are given herein for illustrative purpose only, and the selection of appropriate solvents, as hereinbefore mentioned, will be obvious to those skilled in the art of chemistry.

Figure 15:
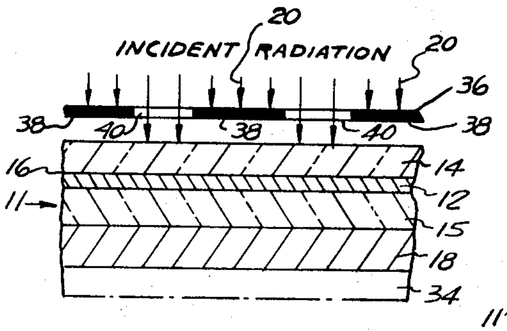
FIG. 15 is a schematic representation in section of another example of electromagnetic radiation-sensitive element according to the invention in the course of selective and discrete exposure to incident electromagnetic actinic radiation through a mask.

Referring again to the drawings, and more particularly to FIG. 15 thereof, an electromagnetic radiation-sensitive element 11 according to another aspect of the present invention comprises, as schematically illustrated in an exaggerated fashion in cross section, an overlayer 14 of an inorganic material deposited upon a metallic layer 12. The metallic layer 12 may thus include silicon or any one of the common metals hereinbefore mentioned while the inorganic material of the overlayer 14 may be any one of the inorganic materials also hereinbefore mentioned. The thickness of each of the respective metallic layer 12 and overlayer 14 is of the order of a few atom layers to several thousand Angstroms, or even a few microns, as also previously mentioned, and they are obtained in the same manner as also previously indicated herein.

The metallic layer 12 is disposed in adhesion upon a layer 15 of any one of the inorganic materials suitable, as hereinbefore indicated, for forming the overlayer 14. Preferably, although not exclusively so, the inorganic material forming the layer 15 in most embodiments of the present invention may be the same material as the material forming the overlayer 14.

A fourth layer or substrate 18 is disposed adjoining the layer 15, in adhesion therewith. The substrate 18 may be made of any one of a multitude of materials such as a metal or mixtures of metals, alloys and mixtures thereof, plastics, glass, etc. If so desired, a support member, shown in phantom lines at 34, may be disposed in adhering juxtaposition with the substrate 18, for certain applications where such a support member is desirable. The diverse layers are placed upon each other by vacuum-deposition techniques and the like.

When exposed to electromagnetic actinic radiation, such as ordinary white light, the inorganic material of the overlayer 14 reacts with the metallic layer 12 at the boundry 16 therebetween, and the interreaction extends in depth into both the overlayer 14 and the metallic layer 12. For sufficient exposure to electromagnetic actinic radiation energy, such interreaction propagates itself in depth through both the overlayer 14 and the metallic layer 12 as long as the irradiation continues, and for appropriate relative thickness of the metallic layer 14 and the overlayer 12, the formation of an interreaction product or products as a result of such irradiation causes an in-depth etching effect upon the metallic layer 12 extending from surface to surface of such layer, as previously mentioned. Thus, if the radiation-sensitive element 11 is exposed to incident actinic radiation, such as shown at 20, through a mask 36 having portions 38 substantially nontransmissive of the radiation, and other portions, such as 40, substantially transmissive of the radiation, there is caused a selective and discrete irradiation of the element 11 in a pattern corresponding to the pattern formed on the mask 36 by the transmissive portions 40 thereof, as shown in FIG. 15. Alternately, the radiation sensitive element 11 may be exposed by projecting thereon an optically enlarged or reduced appropriate image, by optical projection means well-known to those skilled in the art.

Figure 16:
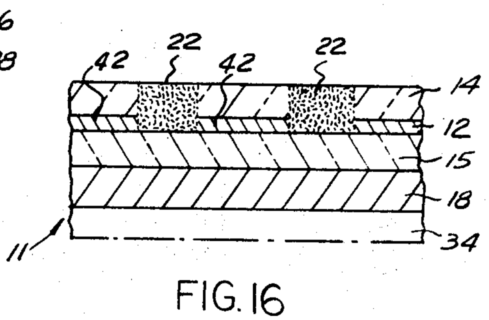
FIG. 16 is a view similar to FIG. 15, but showing the radiation-sensitive element after exposure to incident electromagnetic actinic radiation.

As shown at FIG. 16, as a result of appropriate selective and discrete exposure to electromagnetic actinic radiation, there is caused a radiation-provoked selective and discrete interreaction between the material of the overlayer 14 and the material of the metallic layer 12, corresponding to the areas or portions subjected to irradiation, with the ultimate formation of interreaction product or products, as shown at 22. For adequate exposure to electromagnetic radiation in intensity or duration, or both, the formation of such interreaction product 22 exhausts in depth all of the material of the metallic layer 12, such that the metallic layer 12 is selectively and discretely etched in a manner corresponding to the original radiant image projected upon the radiation-sensitive element.

A typical radiation-sensitive element 11 will not be described for illustrative purpose for the sake of explaining the principles of the present invention and the steps in the method of practicing the invention. It should, however, be appreciated that such an example of embodiment and such examples of methods whereby the particular embodiment is used for obtaining a variety of finished articles are not intended in a limitative sense, and are herein given only for the sake of simplification of the explanation of the principles involved in the invention. Such a typical radiation sensitive element 11 comprises a thin overlayer 14 made, for example, of arsenic trisulfide, $As_2S_3$, coating a substantially thin metallic layer 12 of silver deposited upon a layer 15 made also of arsenic trisulfide. The substrate 18 is made of a metal such as, for example, also silver. The support member 34 may consist of any convenient material, and in some applications, the support member 34 may be omitted. Each layer 12, 14, 15 and 18 typically is from a few atom layers thick to a few microns thick according to whatever application is contemplated for the finished article, and the layers are deposited on the top of each other by any convenient process such as the vacuum-deposition techniques hereinbefore mentioned.

Figure 17:
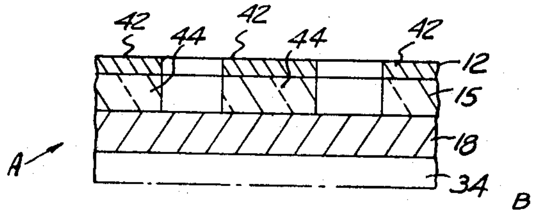
FIG. 17 is a view similar to FIG. 16, but showing the resulting article after a single-step etch according to an aspect of the present invention.

After adequate selective and discrete exposure to electromagnetic actinic radiation, typically for a period of a fraction of a second to several minutes, according to the thickness of the overlayer 14 and of the metallic layer 12, the irradiated element 11 is provided with portions or areas of interreaction product as shown at 22 at FIG. 16, corresponding to the irradiated areas and having exhausted in depth all of the material of the metallic layer 12. The exposed or irradiated sensitive element is then processed with an etchant or solvent being played upon the surface of the overlayer 14. In the example of structure chosen, a preferred etchant or solvent is an aqueous solution of a base such as sodium, potassium or ammonium hydroxide, in which the arsenic trisulfide of the overlayer 14 is soluble, and in which the interreaction product 22 is also soluble. Consequently, by playing the solvent upon the surface of the arsenic trisulfide layer 14 for a sufficient period of time, the unreacted portions of the overlayer 14 are dissolved together with the interreaction product 22. The portions of the metallic layer 12, such as shown at 42, which have not reacted with the arsenic trisulfide of the overlayer 12 during exposure to the actinic radiation through the mask are thus caused to behave as a solvent mask or resist with respect to the underlying portions 44 of the layer 15 corresponding in depth to the portions of the metallic layer 12 having not previously been consumed during exposure of the element to the incident actinic radiation, utilizing for example a mild alkali as an etchant. Consequently, the finished article, after being etched as previously described, is substantially as schematically shown at A in FIG. 17, presenting portions consisting of the unetched portions of the layer 15, as shown at 44, corresponding to the portions masked by the unreacted portions 42 of the metallic layer 12. The metal of the substrate 18, silver in the present example, being insoluble in the etchant or solvent chosen, the etching action of the solvent upon the layer 15 of arsenic trisulfide extends in depth only down to the boundary between such layer 15 and the metallic layer or substrate 18. The article A shown in FIG. 17, which is a finished article in some applications where such a configuration is desired, is thus obtained by a one-step etch process following exposure of the radiation-sensitive element to image-forming incident actinic radiation.

Where it is desired to obtain a finished article in which the substrate 18 is also etched according to the shape or contour of the image projected upon the radiation-sensitive element, in the example of configuration chosen where the substrate 18 consists of silver, an acid etchant, such as an aqueous solution of sulfuric acid, hydrochloric acid, or the like, is played upon the surface of the metallic layer 12 of FIG. 17, such that the remaining portions 42 of the metallic layer 12 are dissolved at the same time as are dissolved the portions of the substrate 18 exposed to the action of the etchant, corresponding to the portions which are not protected by the remaining portions 44 of the layer 15 of the arsenic trisulfide layer. The remaining portions 44 of the layer 15 of arsenic trisulfide layer act as a resist, such that the finished article B of FIG. 18 consists of a glassy arsenic trisulfide pattern defined by the remaining portions 44 of the layer 15, coating a metallic pattern consisting of the unetched remaining portions 46 of the substrate 18.

Where the original radiation-sensitive element is provided with a second substrate or support member 34, the finished article of course also includes such second substrate or support member unless the latter is also soluble in the chosen solvent or etchant. However, it is evident that by utilizing a configuration wherein a second support member is present, the material of the support member may be chosen so as to be impervious to both the first and the second etchants such that, by protecting the edge of the radiation-sensitive element with a material similar to the one forming the second substrate or support member, finished articles may be obtained by dipping the sensitive elements, after exposure, into the appropriate solvents or etchants.

A different finished article may be obtained, according to a further aspect of the present invention, by a one-step etch process, after exposure of the radiation-sensitive element to incident electromagnetic actinic radiation, by forming the substrate 18 of a material which is also soluble in the etchant or solvent. For example a radiation-sensitive element comprising an overlayer 14 of arsenic trisulfide, a metallic layer 12 of silver, a third layer 15 also of arsenic trisulfide, and a fourth layer or substrate 18 made of aluminum, may be deeply etched as a result of a one-step etch operation, after appropriate exposure to electromagnetic actinic radiation discretely and selectively impinging upon the element. The one-step etch operation is effected by subjecting the surface of the overlayer 14 of arsenic trisulfide to the action of a solvent consisting of an aqueous solution of a base, such as a solution of sodium hydroxide, potassium hydroxide, or sodium carbonate or sulfate, which is capable of dissolving the arsenic trisulfide forming the overlayer 14 and the interreaction product 22, as previously mentioned, and also the bared portions of the subjacent layer 15 of arsenic trisulfide, thus unmasking, selectively and discretely, appropriate surface areas of the aluminum substrate 18. Because aluminum is also soluble in these particular solutions of a base, the finished article is substantially as shown schematically at C in FIG. 19, and consists of a pattern defined by the unetched portions 48 of the aluminum substrate 18 covered by a coating consisting of the unetched portions 44 of the layer 15 of arsenic trisulfide, in turn coated with the unetched portions 42 of the metallic layer 12 consisting of a metal, silver in the example chosen, which is not soluble in the etchant, an aqueous solution of a base.

Figure 20:
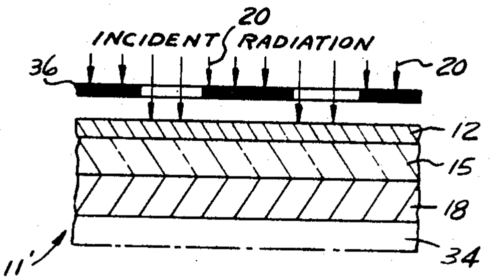
FIG. 20 is a schematic representation in section of a simplified embodiment of a radiation-sensitive element according to the present invention in the course of selective and discrete exposure to incident electromagnetic actinic radiation.

FIG. 20 represents a radiation-sensitive element 11′ substantially like sensitive element 11 of FIG. 15, with the exception of the superficial overlayer 14 thereof which has been omitted. The layer 12 is a metallic layer as previously defined herein with respect to the embodiment of FIG. 15, and is thin enough such as to be substantially transmissive of the incident electromagnetic radiation 20 impinging thereupon, when an image is projected thereupon as a result of exposure to such incident radiation through a mask, as shown at 36 in FIG. 20, or by means of an image being projected thereupon by any other convenient means.

Figure 21:
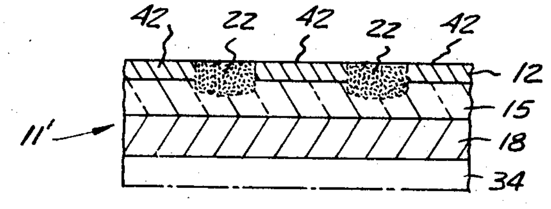
FIG. 21 is a view similar to FIG. 20, but showing the radiation-sensitive element of FIG. 20, after exposure to incident electromagnetic radiation.

At every irradiated portion or area of the metallic layer 12 there is formed an interreaction product, as shown at 22 in FIG. 21, resulting from the radiation provoked interreaction between the material of the metallic layer 12 and the inorganic material of the layer 15. For sufficient exposure to the electromagnetic actinic radiation, all of the material of the metallic layer 12 is thus consumed in depth at such irradiated areas, with the result that the nonirradiated areas are left disturbed, such undisturbed areas being shown at 42 in FIG. 21. The unreacted areas or portions 42 are capable of acting as a resist in the course of a subsequent etching operation with a solvent or etchant able to dissolve the interreaction product 22 and the portions of the layer 15 unprotected by such metallic resist 42.

Figure 22:
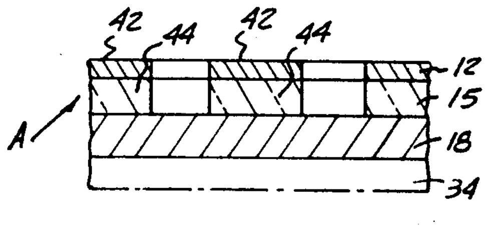
FIG. 22 is a view similar to FIG. 21, but showing the article resulting from a first etch step according to one aspect of the present invention.

A first structure of finished article, as shown at A at FIG. 22, substantially corresponding to article A of FIG. 17, can thus be obtained by playing upon the surface of the metallic layer 12 an etchant capable of dissolving both the interreaction product and the inorganic material of the layer 15, as previously explained. For example, in structures wherein the inorganic material of the layer 15 is arsenic trisulfide, a solution of a base may be used as the etchant.

Figure 18:
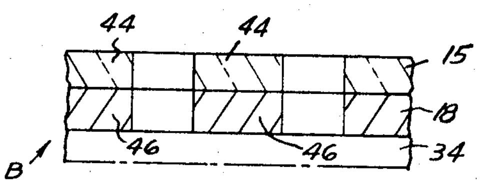
FIG. 18 is a view similar to FIG. 17, but showing the resulting article following a second etch step according to another aspect of the present invention.
Figure 19:
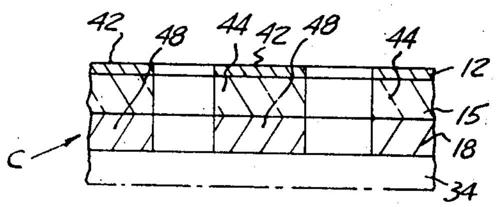
FIG. 19 is a view similar to FIG. 17, but showing the article resulting from an alternate single-step etch according to a further aspect of the present invention.
Figure 23:
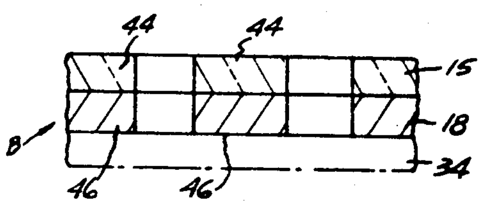
FIG. 23 is a view similar to FIG. 22, but showing the article resulting from a second etch step according to another aspect of the present invention.
Figure 24:
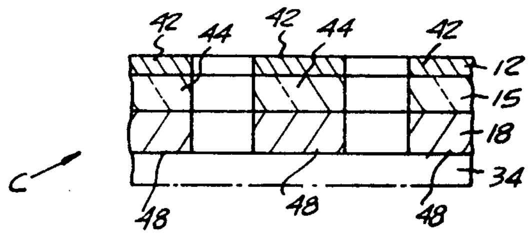
FIG. 24 is a view similar to FIG. 22, but showing the article resulting from a single step etch according to a further aspect of the present invention.

An article according to the structure B, of FIG. 23, substantially alike the article B of FIG. 18, can be obtained as a result of a second etching step in an etchant or solvent capable of dissolving the remaining portions of the metallic layer 12 and capable of attacking the unprotected areas of the substrate 18. For example, an acid etchant may be used in structures wherein the substrate 18 is metallic.

Where the material of substrate 18 is chosen such as to be also soluble in the first etchant, an article according to the article C of FIG. 24 may be obtained, which is the full equivalent of article C of FIG. 19, as a result of a one-step etch operation. For example, a basic etchant such as sodium hydroxide may be used in structures wherein the substrate 18 is aluminum.

Figure 25:
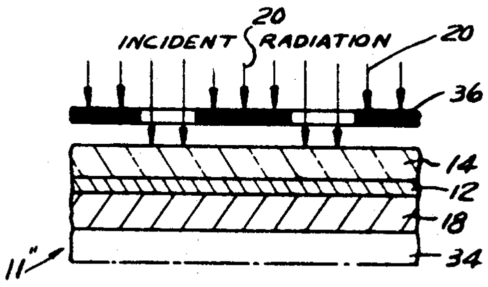
FIG. 25 is a schematic representation in section of a further example of radiation-sensitive element according to the invention in the course of selective and discrete exposure to incident electromagnetic actinic radiation.

FIG. 25 represents, schematically in section, a radiation-sensitive element 11″ which may be used to practice the teachings of the present invention for obtaining a relief image in applications where a lesser degree of relief is desired. The radiation-sensitive element 11″ of FIG. 25, substantially like one of the embodiments as described in detail in the parent application, Ser. No. 839,038, filed July 3, 1969, comprises a first layer of inorganic material 14 disposed on a metallic layer 12 which in turn is disposed on a third layer or substrate 18. A support member 34 may be also provided if so required.

Figure 26:
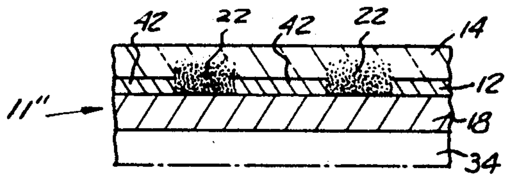
FIG. 26 is a view similar to FIG. 25, but showing the radiation-sensitive element after exposure to incident electromagnetic radiation.
Figure 27:
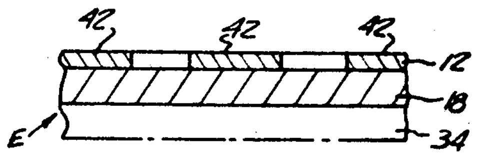
FIG 27 is a view similar to FIG. 26, but showing the resulting article after a single step etch according to one aspect of the present invention.
Figure 28:
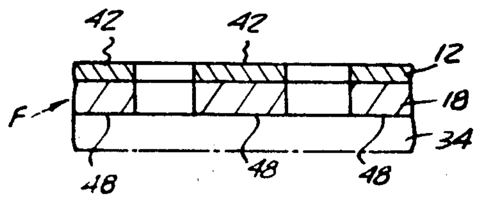
FIG. 28 is a view similar to FIG. 27, but showing the resulting article following a second etch step according to another aspect of the present invention; or alternately the equivalent resulting article following a one-step etch according to a further aspect of the invention.

The inorganic material of the layer 14 is capable of interreacting, when exposed to electromagnetic actinic radiation, with the material of the metallic layer 12 so as to form therewith an interreaction product. Consequently, after exposure to incident electromagnetic actinic radiation through a mask 36, as shown in FIG. 25, or after projecting upon the element an appropriate radiant image, the portions of the layer 14 which have selectively and discretely interreacted with the metallic layer 12 cause the formation of an interreaction product as shown at 22 in FIG. 26. A subsequent etching operation in an etchant capable of dissolving both the remaining portions of the layer 14 of inorganic material and the interreaction product 22 results in obtaining the finished article E, FIG. 27, provided with a substrate 18 having on a face a pattern of a relief image consisting of the remaining portions 42 of the metallic layer 12. If the material of the substrate 18 is chosen to be also soluble in the etchant, the finished article is as article F of FIG. 28, provided with a pattern consisting of the remaining portions 48 of the substrate 18. Such will be the case, for example, with a radiation-sensitive element have a layer 14 consisting of arsenic trisulfide, metallic layer 12 consisting of silver and a substrate 18 made of aluminum, treated in a one-step etch operation by an aqueous solution of sodium, potassium or ammonium hydroxide.

If the material of the substrate 18 is not soluble in the first etchant, then a second etchant in which the material of the substrate 18 is soluble is played upon the surface of the metallic layer 12 of the article E of FIG. 27, such that the substrate 18 is selectively and discretely etched so as to provide the article F shown at FIG. 28.

It can thus be seen that the present invention provides for radiation-sensitive elements which have high utility for manufacturing finished articles consisting of a relief image of any adequate pattern or contour, by way of a method or methods consisting of a single etching step or, alternately, of a few simple etching steps, by providing an improved "photoresist" obtained simply and presenting selective resistance to various etchants. Additionally, particular layers in the structures of the invention may be removed as a whole, where so desired, as a result of uniform mild exposure to electromagnetic actinic radiation, substantially reducing the adhesion of such layer with the subjacent layer.

It is obvious, as previously mentioned, that the materials of the diverse layers may be chosen such as to be selectively soluble in different etchants such that any appropriate configuration of finished article may be obtained according to the etchants used and to the order of consecutive etching steps. For example, article B of FIG. 23 could be obtained from the radiation-sensitive element 11' of FIG. 20 as a result of the following etching steps after selective and discrete exposure to electromagnetic actinic radiation:

A first etch operation dissolving the interreaction product 22 (FIG. 21) and the corresponding area portions of the layer 15, resulting in article A of FIG. 22; for example, with the metallic layer 12 made of silver, the layer 15 made of arsenic trisulfide and the substrate 18 made of aluminum, a solution of ammonium hydroxide, may be used for the first etch step.

A second etch operation dissolving the unprotected portions of the substrate 18 of article A, thus resulting in article C of FIG. 24; for example, with the example of structure, hereinbefore mentioned, a solution of sodium hydroxide may be used for the second etch step.

And a third etch operation dissolving the remaining portions of the layer 12 of article C, thus finally resulting in article B of FIG. 23; for example nitric or sulfuric acid may be used for the third etch step.

With structures of radiation-sensitive element substantially as shown at 11 at FIG. 15 with layers 12, 14, 15, substrate 18 and support member 34 made of dissimilar materials selectively soluble in different etchants or solvents, a plurality of diverse finished articles may be obtained depending upon the choice of material of each layer, the choice of etchants or solvents and the number and order of etch operations.

Having thus described the present invention by way of a few illustrative examples thereof, what is sought to be protected by United States Letters Patent is as follows:

1. A method for preparing a plate element provided with a relief image coated with an inorganic overlayer comprising: projecting an actinic radiation image upon an electromagnetic radiation-sensitive element having a first layer of a material capable of entering in solution in an etchant, an adhering second layer which is selected from the group consisting of silver, copper, lead cadmium, zinc, iron, tin, arsenic, bismuth, cobalt, germanium, indium, manganese, mercury, nickel, selenium, silicon, tellurium, thallium and vanadium, and an adhering overlayer of an inorganic material substantially transmissive of said radiation and capable when exposed to electromagnetic actinic radiation to interreact with said second layer such that the formation of an interreaction product at the boundary between said second layer and said overlayer causes a discrete radiation-induced complete etching in depth of said second layer for adequate amount of electromagnetic radiation impinging thereupon, wherein said inorganic material is different from the material of said second layer and is selected from the group consisting of sulfur, selenium, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, removing said interreaction product so as to bare potions of said first layer, and etching the first layer where thus bared in said etchant.

2. The method of claim further comprising removing said overlayer.

3. The method of claim 1 further comprising: re-exposing said radiation-sensitive element uniformly to electromagnetic actinic radiation for forming an interreaction product between the unreacted portions of said second layer and said overlayer for decreasing the adhesion between said second layer and said overlayer, and removing said overlayer.

4. A method for preparing a plate element provided with a relief image comprising: projecting an actinic radiation image upon an electromagnetic radiation-sensitive element having a first layer of a material capable of entering in solution in an etchant, a second layer having substantial resistance to the action of said etchant and which is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, and an overlayer of an inorganic material substantially transmissive of said radiation capable when exposed to electromagnetic actinic radiation to interreact with said second layer such as to cause a discrete radiation-induced complete etching in depth of said layer for adequate amount of electromagnetic radiation impinging thereupon, wherein said inorganic material is different from the material of said second layer and is selected from the group consisting of sulfur, selenium, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, removing said interreaction product so as to bare portions of said first layer, removing said overlayer and etching the first layer where thus bared in said etchant.

5. A method for preparing a plate element provided with a relief image comprising: projecting an actinic radiation image upon an electromagnetic radiation-sensitive element having a first layer of a material capable of entering in solution in an etchant, a second layer having substantial resistance to the action of said etchant and which is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, and an overlayer of an inorganic material substantially transmissive of said radiation and capable of entering in solution in said etchant and capable when exposed to electromagnetic actinic radiation to interreact with said second layer such that the formation of interreaction product at the boundary between said second layer and said overlayer causes a discrete radiation-induced complete etching in depth of said second layer for adequate amount of electromagnetic radiation impinging thereupon, wherein said inorganic material is different from the material of said second layer and is selected from the group consisting of sulfur, selenium, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, removing said interreaction product so as to bare portions of said first layer, and etching the first layer where thus bared in said etchant whilst simultaneously dissolving said overlayer in said etchant.

6. A method for making a relief image by means of electromagnetic radiation-sensitive element comprising three dissimilar superimposed layers substantially adhering to each other, the first of said layers being selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the second of said layers being an inorganic material different from that of said first layer and capable when exposed to electromagnetic actinic radiation to form an interreaction product with said first layer, wherein said inorganic material is selected from the group consisting of sulfur, selenium, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, and the third of said layers being a material incapable of interreacting with said second layer, wherein said first layer is substantially transmissive of said radiation and wherein said interreaction product and said second and third layers are soluble in a first solvent and said first layer is soluble in a second solvent, said method comprising the steps of:

impinging an actinic radiation-defined image upon said first transmissive layer for causing selectively and discretely the formation of said interreaction product at the boundary between said first and second layers selectively and discretely consuming portions of said first layer, and selectively and discretely dissolving in said first solvent said interreaction product and corresponding portions of said second and third layers.

7. The method of claim 6, wherein the formation of said interreaction product causes an etching of the first layer which extends in depth all the way through said first layer.

8. The method of claim 6, further comprising the step of:

dissolving in said second solvent the remaining of said first layer.

9. A method for making a relief image by means of an electromagnetic radiation-sensitive element comprising three dissimilar superimposed layers substantially adhering to each other, the first of said layers being selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the second of said layers being an inorganic material different from that of said first layer and capable when exposed to electromagnetic actinic radiation to form an interreaction product with said first layer, wherein said inorganic material is selected from the group consisting of sulfur, selenium, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, and the third of said layers being a material incapable if interreacting with said second layer, wherein said first layer is substantially transmissive of said radiation and wherein said interreaction product and said second layers are soluble in a first solvent and said third layer is soluble in a second solvent, said method comprising the steps of:

impinging an actinic radiation-defined image upon said first layer for causing selectively and discretely the formation of said interreaction product at the boundary between said first and second layers selectively and discretely consuming portions of said first layer, and selectively and discretely dissolving in said first solvent said interreaction product and corresponding portions of said second layer so as to bare portions of said third layer.

10. The method of claim 9, wherein the formation of said interreaction product causes a selective etching of the first layer which extends in depth all the way through said first layer.

11. The method of claim 9 further comprising the step of:

dissolving in said second solvent the exposed portions of said third layer.

12. The method of claim 11, wherein the remaining of said first layer is dissolved in said second solvent simultaneously with said exposed portions of said third layer.

13. A method for making a relief image by means of an electromagnetic radiation-sensitive element comprising four dissimilar superimposed layers substantially adhering to each other, the second of said layers being selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the first and third of said layers being an inorganic material different from that of said second layer and capable when exposed to electromagnetic actinic radiation to form an interreaction product with said second layer, wherein said inorganic material is selected from the group consisting of sulfur, selenium, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium, and tellurium, and the fourth of said layers being a material incapable of interreacting with said third layer, wherein said first layer is substantially transmissive of said radiation and wherein said first, third and fourth layers and said interreaction product are soluble in a first solvent and said second layer is soluble in a second solvent, said method comprising the steps of:

impinging an actinic radiation-defined image upon said first layer for causing selectively and discretely the formation of said interreaction product at the boundary between said first and second layers selectively and discretely consuming portions of said second layer, and selectively and discretely dissolving in said first solvent said interreaction product and corresponding portions of said first, third and fourth layers.

14. The method of claim 13, wherein the formation of said interreaction product causes a selective etching of the second layer which extends in depth all the way through said second layer.

15. The method of claim 13, further comprising the step of:

dissolving in said second solvent the remaining of said second layer.

16. A method for making a relief image by means of an electromagnetic radiation-sensitive element comprising four dissimilar superimposed layers substantially adhering to each other, the second of said layers being selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the first and the third of said layers being an inorganic material different from that of said second layer and capable when exposed to electromagnetic radiation to form an interreaction product with said second layer, wherein said inorganic material is selected from the group consisting of sulfur, selenium, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, and the fourth of said layers being a material incapable of interreacting with said third layer, wherein said first layer is substantially transmissive of said radiation and wherein said first and third layers and said interreaction product are soluble in a first solvent and said fourth layer is soluble in a second solvent, said method comprising the steps of:

impinging an actinic radiation-defined image upon said first layer for causing selectively and discretely the formation of said interreaction product at the boundary between said first and second layers selectively and discretely consuming portions of said second layer, and selectively and discretely dissolving in said first solvent said interreaction product and corresponding portions of said first and third layers so as to bare portions of said fourth layer.

17. The method of claim 16, wherein the formation of said interreaction product causes a selective etching of the second layer which extends in depth all the way through said second layer.

18. The method of claim 16, further comprising the step of:

dissolving in said solvent the bared portions of said fourth layer.

19. The method of claim 16, wherein the remaining of said second layer is dissolved in said second solvent simultaneously with said bared portions of said fourth layer.

20. A method for making a relief image by means of an electromagnetic radiation-sensitive element comprising three dissimilar superimposed layers substantially adhering to each other, the first of said layers being an inorganic material capable when exposed to electromagnetic actinic radiation to form an interreaction product with the second of said layers, said inorganic material being selected from the group consisting of sulfur, selenium, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, the second of said layers is a material different from that of said first layer and is selected from the group consisting of silver, copper, lead, cadmium, zinc, iron, tin, arsenic, bismuth, cobalt, germanium, indium, manganese, mercury, nickel, selenium, silicon, tellurium, thallium, and vanadium, and the third of said layers being a material incapable of interreacting with said second layer, wherein said first layer is substantially transmissive of said radiation and wherein said interreaction product and said first layers are soluble in a first solvent and said third layer is soluble in a second solvent, said method comprising the steps of:

impinging an actinic radiation-defined image upon said first layer for causing selectively and discretely the formation of an interreaction product at the boundary between said first and second layers selectively and discretely consuming portions of said second layer, and selectively and discretely dissolving in said first solvent said interreaction product and said first layer so as to bare portions of said third layer.

21. The method of claim 20 wherein the formation of said interreaction product causes a selective etching of the second layer which extends in depth all the way through said second layer.

22. The method of claim 20, further comprising the step of:

dissolving in said second solvent the bared portions of said third layer.

23. A method for making a relief image by means of an electromagnetic radiation-sensitive element comprising three dissimilar superimposed layers substantially adhering to each other, the first of said layers being an inorganic material capable when exposed to electromagnetic actinic radiation to form an interreaction product with the second of said layers, said inorganic material being selected from the group consisting of sulfur, selenium, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, the second of said layers is a material different from that of said first layer and is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, and the third of said layers being a material incapable of interreacting with said second layer, wherein said first layer is substantially transmissive of said radiation and wherein said interreaction product and said first and third layers are soluble in a solvent, said method comprising the steps of:

impinging an actinic radiation-defined image upon said first layer for causing selectively and discretely the formation of an interreaction product at the boundary between said first and second layers selectively and discretely consuming portions of said second layer, and selectively and discretely dissolving in said solvent said first layer and said interreaction product and portions of said third layer corresponding to the consumed portions of said second layer.

24. The method of claim 23, wherein the formation of said interreaction products causes a selective etching of the second layer which extends in depth all the way through said second layer.

* * * * *

TRI-115-B-2

UNITED STATES PATENT OFFICE
CERTIFICATE OF CORRECTION

Patent No. 3,637,383 Dated January 25, 1972

Inventor(s) ROBERT W. HALLMAN ET AL

It is certified that error appears in the above-identified patent and that said Letters Patent are hereby corrected as shown below:

In the List of References Cited, Other Publications, change "Kostyship" to - - Kostyshin - -

IN THE SPECIFICATION

Column 2, line 28, change "be come" to - - become- -

Column 3, line 54, cancel "metals"

Column 4, line 50, after "metal" cancel "and"

Column 5, line 35, after "film" insert - - of - -

Column 6, line 35, change "conveyor" to - - overlayer - -

Column 7, line 9, change "bound" to - - bond - -

Column 8, lines 12-13, change "metallic layer 14" to - - metallic layer 12 - - line 13, change "overlayer 12" to - - overlayer 14 - -

Column 8, line 43, change "not" to - - now - -

Column 10, line 39, change "disturbed" to - - undisturbed - -

3,637,383

Robert W. Hallman et al.

IN THE CLAIMS

Column 12, line 31, change "potions" to - - portions - - line 33, after "claim" insert - - 1 - -

Column 14, line 9, change "if" to - - of - -

Signed and sealed this 5th day of September 1972.

(SEAL)
Attest:

EDWARD M.FLETCHER,JR.
Attesting Officer

ROBERT GOTTSCHALK
Commissioner of Patents